July 9, 1968

H. ADLER 3,391,864

DEAD-RECKONING COMPUTER

Filed Sept. 8, 1966

INVENTOR.
HAROLD ADLER

BY
Kenway, Jenney & Hildreth

INVENTOR.
HAROLD ADLER

INVENTOR.
HAROLD ADLER
BY Kenway, Jenney & Hildreth

July 9, 1968

H. ADLER 3,391,864

DEAD-RECKONING COMPUTER

Filed Sept. 8, 1966

INVENTOR.
HAROLD ADLER
BY *Kenway, Jenney & Hildreth*

INVENTOR.
HAROLD ADLER

United States Patent Office 3,391,864
Patented July 9, 1968

3,391,864
DEAD-RECKONING COMPUTER
Harold Adler, Huckleberry Hill, Lincoln, Mass. 01773
Filed Sept. 8, 1966, Ser. No. 578,068
8 Claims. (Cl. 235—71)

ABSTRACT OF THE DISCLOSURE

A computer for reckoning time, distance, and speed has a beam with a fixed-length scale for one variable, an expansible loop scale for another, and means for adjusting the expansion of the loop to correlate time with speed. The loop is mounted on rotatable means for changing its position to match current clock time with a zero index as each leg of the trip is completed. The distance travelled on preceding legs, and/or the remaining distance to complete the trip, are automatically recorded by registers driven by the loop-rotating means. The registers may be revolution counters, or loops of fixed length. A cursor is also provided for accurate comparison of intermediate times and distances; this may be a slide, or another loop of fixed length.

---

This invention relates to computers useful for reckoning times and distances during a journey on the basis of ground speed made good to intermediate points, or other means of estimating speed, and has as its general object the provision of improved instruments of this nature. More specific objects are to provide convenient means for estimating the time of arrival at a destination or at intermediate check points without computation, and also for determining the distance travelled and the remaining distance to complete the trip. It is a further object to provide an improved dead-reckoning computer which may be used without reference to a chart or map during a journey. Additional objects and advantages will appear as the following description proceeds.

My U.S. Patent 3,213,544, issued Oct. 26, 1965 and entitled, "Instrument for Computing Time of Arrival at a Destination," described and claimed a computing instrument consisting essentially of a divider or beam compass having an expansible time scale loop reeved about relatively movable index points. The estimated time of arrival at any later point in a journey can be arrived at simply by adjusting the divider so that the time elapsed during a completed leg, as read in clock time on the expansible time scale, coincides with this leg as shown on the chart. The time scale is thus adjusted automatically for the actual speed made good, and the estimated time of arrival at any further point in the trip can be read directly at the coincidence of that further point on the chart with the time scale. It is particularly advantageous that the expansible loop time scale is movable about the index points of the divider, since the current clock time can be brought into coincidence with one's present location; this avoids any need for recollection of time of departure and addition of the elapsed time since leaving the previous check-point. Also, the estimated time of arrival at any further point in the trip appears on the scale as clock time rather than elapsed time, which would have to be added to the current clock time to derive the clock time of estimated arrival.

According to the present invention, a dead-reckoning computer is provided with additional means which obviate the need for reference to a chart during the journey. This is of particular advantage for use in light aircraft, since the pilot must ordinarily act as navigator, but can spare little attention to a chart while in flight. It is also highly useful in sailboats of moderate size, or in other situations where it is inconvenient to make reference to charts or maps while underway.

This invention also contemplates the provision in a dead-reckoning computer of means for automatically computing and registering the distance travelled to a check-point, and/or the remaining distance to a destination.

My improved computing instrument includes a beam or fixed scale member, a velocity/distance scale which bears mileage and/or velocity indicia, and a time scale; one of the two scales is expansible, while the other is of a fixed length, and may be inscribed on the beam. The expansible scale extends from a zero index to a means for adjusting its length, which may be an index member movable along the beam. The expansible scale may be a closed loop which is stretched by moving the index member along the beam; or can be wound up on a shaft index member.

As an example, the velocity scale can be inscribed on the beam, and the time scale can be an expansible loop. Each run of the loop time scale then includes a given number of minutes or hours, and since there is a fixed relation between mileage travelled and velocity for a given period of time, fixed scales are used for both mileage and velocity.

In alternative forms, the movable index member and the zero index may comprise the legs of a divider; a slide mounted in ways within the beam, and a fixed zero index on the latter member; or a reel for winding up the expansible scale, and a fixed zero index on the beam. In the second of these forms, the index member may be movable by means of a lead screw, or a nonstretching flexible tape which is wound on a rotatable shaft at an end of the beam, or by other suitable means.

Independence from the use of charts during a journey is secured by means of a cursor, which may be a slide similar to the cursor used in a slide rule, or may comprise a movable nonstretching tape. The cursor bears a hairline or zero index mark for comparing the time scale with the mileage scale. Before starting, the user sets the movable index member to adjust the length of the expansible scale, matching the time scale with his initial estimate of velocity or distance/time ratio. The cursor is then set at the mileage of any known intermediate checkpoint, and indicates the estimated time of arrival at that point on the time scale.

The time scale is preferably a movable loop, so that it can be set to bring the current clock time in minutes to the zero index point, at the time of departure. Upon arriving at the checkpoint, the actual clock time is noted, and the movable index member is moved as necessary to show this clock time at the cursor. Thus the estimates of the times of arrival at further checkpoints or at the destination are automatically corrected for the actual speed thus far made good. Reference to a chart is not necessary during the journey, although of course the instrument may be compared with a chart for setting further checkpoints, or other purposes, as desired.

The invention also contemplates automatic summation of the increments of distance in each leg of the trip between checkpoints, to afford a registration of the total distance completed and/or the distance remaining to be travelled. An adjustable time scale is set back to the zero index at a checkpoint, to bring the current clock time to the zero index position; the length of the time scale thus rolled back is proportional not only to elapsed time, but also to the distance travelled in the leg just completed, and can be registered as such.

If a loop time scale is used, the number of revolutions completed by a roller supporting the time loop is registered on a connected revolution counter, to give a totalized reading in terms of miles travelled. An additional revolution counter may be geared or marked in reverse to subtract mileage, and is preset to the total distance in the journey to afford a reading of the distance remaining. In an alternative embodiment, the revolution counters are replaced by nonexpanding mileage loops reeved about the shaft of the time loop roller, and marked or driven in opposite senses to provide the two readings.

For some purposes, it may be desired to use the computer with a chart, and to move the instrument along a course line drawn on the chart as the journey progresses. In this case, chart rollers are provided to drive the time loop in a reverse sense, and thus roll the time loop backwards so that the time indicia on the loop remain stationary with respect to corresponding points on the chart. The instrument can then be moved along the course line with a continuously correct reading of local clock time of arrival at all points in the trip.

While the specification concludes with claims particularly pointing out the subject matter which I regard as my invention, it is believed that a clearer understanding may be gained from the following detailed description of preferred embodiments, with reference to the accompanying drawings, in which:

Figures 1, 2:
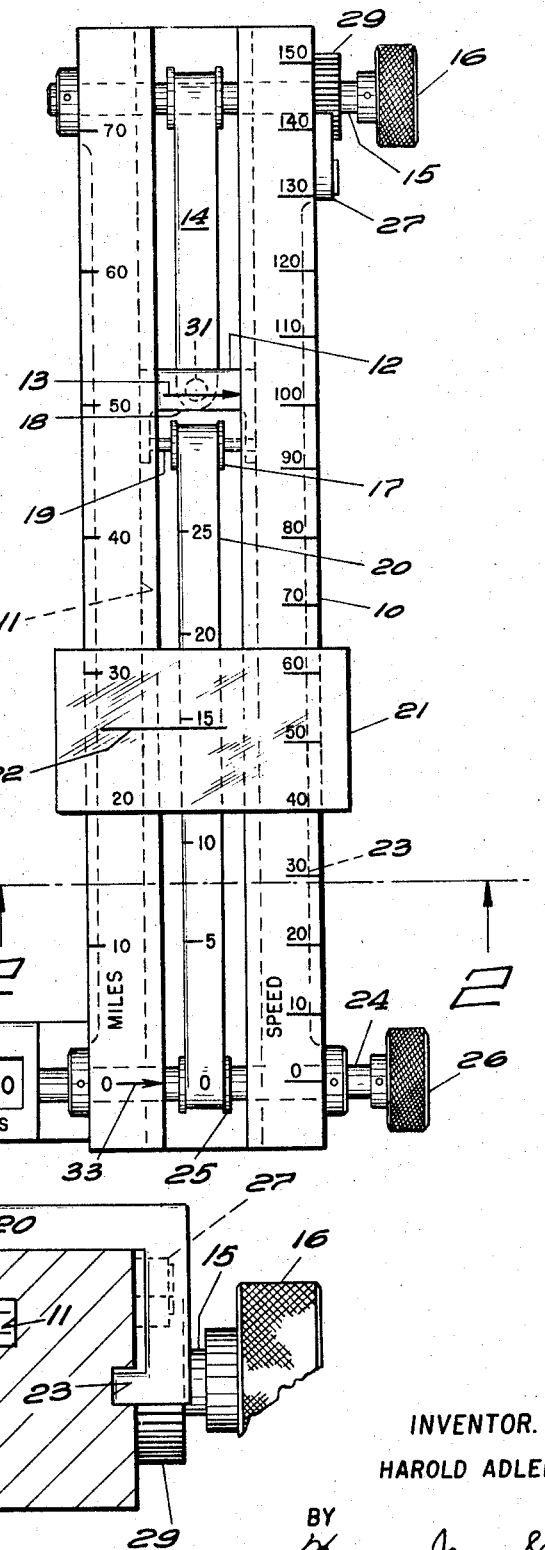
FIGURE 1 is a plan view of a first embodiment of the improved computer.
FIGURE 2 is a sectional view taken along line 2—2 in FIGURE 1.

The instrument illustrated in FIGURES 1 and 2 includes a beam or velocity/distance scale member 10, having a longitudinal groove or ways 11 slidably receiving an adjusting means or velocity index member 12. The member 10 is conveniently marked with a velocity scale shown at the right in FIGURE 1, and with a mileage scale at the left. Either one of these can be omitted if a more compact instrument is desired, since distance and velocity bear a fixed relationship for a given time interval, which is determined by the scale of a time loop 20. The index member 12 is formed with a recess 18, in which a roller 17 is rotatably mounted, for expanding and contracting movement of the loop 20 by the index member. A velocity indicator 13 is inscribed on the member 12 for cooperation with the velocity scale. Alternatively, the axis of the roller 17 can be used to indicate the velocity reading corresponding to the full scale of the visible loop of the time scale 20, if the scales are so chosen.

The time scale 20 is an expansible loop of rubber or other stretchable material and is rotatably supported on the roller 17 and on a further roller 25, which is fixed on a shaft 24. This shaft is rotatably mounted in the member 10, in alignment with zero indices 33 on the velocity and mileage scales. The time scale, is, in this instance, marked 0–60 minutes about its periphery. The distance from the zero indices to the indicator 13 is equal to 30 minutes on the scale 20. The loop wraps halfway around its rollers, so that the 30-minute mark is hidden; but the indicator 13 is offset from the axis of the roller 17 a distance equal to half of the roller circumference to compensate, and thus represents the 30-minute mark correctly. The zero mark on the velocity scale need not be aligned with those of the mileage or time scales if the indicator 13 is appropriately offset. Indeed, for some uses such as in aircraft, it is not necessary to provide velocity markings less than the minimum speed of the vehicle, and a zero velocity mark can be omitted.

Mileage on the scale at the left is marked in a ratio to the velocity scale which is determined by the time scale. In the illustrated construction, since the time scale is 30 minutes, this ratio is 1:2, e.g., 100 miles per hour corresponds to a distance of 50 miles to be travelled in 30 minutes. If a 60 minute time scale were used, the mileage scale would be the same as the velocity scale and could be omitted if their zero marks coincide. Further, the time scale loop may be marked on its reverse faces with different time scales, so that it can be turned inside out and used with different velocity and mileage scales.

The velocity index member 12 is conveniently movable by means of a setting knob 16, borne by a shaft 15 rotatably mounted in the member 10. A nonstretchable flexible tape 14, which may be of Mylar or other sheet material, is reelable on the shaft 15 and is pinned at one end 31 to the member 12. A ratchet 29 is carried by the shaft 15, and cooperates with a pawl 27 pivotally mounted on the side of the scale member 10 to hold the index member 12 in position against the tension of the stretched time scale 20. The pawl may be spring-loaded if desired, so that the setting knob 16 can be turned without manipulating the pawl. Alternatively, the shaft 15 may be turned by a lead screw to hold it against the tension of the time scale.

A transparent cursor 21 is slidably mounted on the scale member 10 in ways 23, and is similar to the cursor of a slide rule. A hairline 22 is scribed on the cursor for convenience in comparing the mileage and time scales.

The shaft 24 bears a setting knob 26 to enable the operator conveniently to set the time scale to show current clock minutes in alignment with the zero indices of the other scales, so that the estimated time at further points in the journey will read directly in clock minutes. This avoids any need for mental computation to convert elapsed time to clock time.

As a check point is reached, the operator first resets the velocity index member 12 by turning the knob 16, so that the actual clock minutes at the check point coincide with the hairline 22. This adjusts the time scale 20 for the actual speed made good to the checkpoint. The operator then turns the knob 26 to bring the current clock minutes into alignment with the zero indices 33 on the fixed scales. This automatically sets the time scale to indicate estimated clock time of arrival at various distances further along in the journey, as measured from the checkpoint.

This resetting of the time scale by the knob 26 makes it feasible to sum distances travelled automatically, and to register the mileage completed and/or the mileage remaining to the end of the trip. In the embodiment shown in FIGURES 1 and 2, this function is performed by a revolution counter 28 having a reset knob 30 and driven by the shaft 24. Each revolution of the shaft 24 is proportional to a given mileage travelled, depending only upon the scale of the mileage indicia and the diameter of the roller 25; it makes no difference how far the time loop may be expanded. Therefore, the revolution counter bears mileage indicia to read directly in terms of the distance travelled. If desired, an additional revolution counter (not shown) can be driven by the shaft 24 to show the mileage remaining in the trip. If this counter has dials which read in reverse, it can be driven directly; or if it has forward reading dials, it can be driven through a reversing gear. At the beginning of the trip, the completed-mileage counter is set at zero, while the mileage-to-travel counter is set to the total length of the journey.

If a series of checkpoints are used, the cursor is reset on arrival at each checkpoint, to the mileage to the next succeeding checkpoint. It may prove convenient to prepare a table of checkpoints and distances in advance for ready references, rather than continually referring to the chart to obtain the successive distances. Additional cursors may of course be mounted on the scale so that a series of checkpoints can be preset, although in this case the clock minutes should not be reset to the zero indices by turning the resetting knob 26, and the mileage counters would therefore be omitted.

Figure 3:
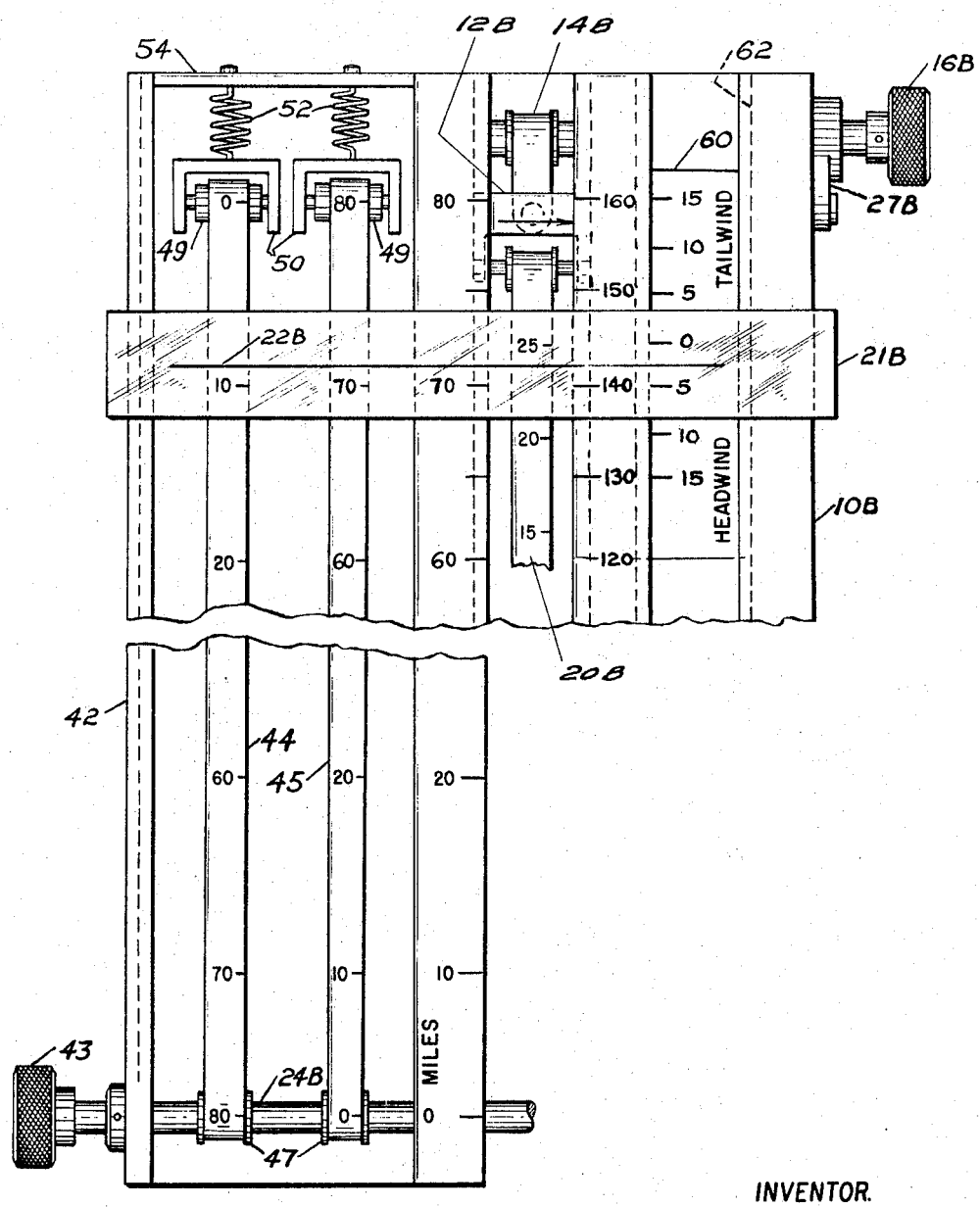
FIGURE 3 is a fragmentary plan view showing an alternative construction.

A modified construction is shown in FIGURE 3, in which the mileage revolution counter or counters are replaced by less expensive mileage scales, in the form of continuous loops 44 and 45 of nonstretchable sheet material such as Mylar. Parts similar to those of the preceding embodiment are similarly numbered with the postscript B. The scale member 10B is extended into a support 42 to accommodate the scales 44 and 45; a first end of each of the scale loops is supported on one of a pair of rolls 47 affixed to the shaft 24B, rotatable by a knob 43. The opposite ends of the two scale loops are supported each on one of a pair of rollers 49, which are rotatably mounted in carriers 50. The carriers are spring-mounted by springs 52 on a projection 54 formed in the extension 42, to maintain a uniform tension and dimension in the scale loops 44 and 45. The loop 45 is marked in a forward direction with a scale of miles about its periphery, while the scale 44 is marked with a reverse mileage scale. At the beginning of the journey, the loop 45 is set with its zero point aligned with the zero indices 33 of the fixed scales, that is at the axis of the shaft 24B; while the loop 44 is set to show the total mileage of the contemplated trip. Then as each checkpoint is reached and the shaft 24B is turned back in the manner described in connection with FIGURE 1, the loop 44 will show the total distance travelled, while the loop 45 will show the remaining distance.

An additional feature in FIGURE 3 is a slide 60 for determination of headwind or tailwind. This slide is movable parallel to the velocity scale in ways 62. A zero index on the slide is initially aligned with the estimated velocity in still air, which is commonly known as "true airspeed." The velocity index member is reset on arrival at a checkpoint, as previously described. The indicator on the velocity index member then shows the component of headwind or tailwind on the slide 60. A similar slide can be used in a marine computer to determine the tide or current component along the course.

Figure 4:
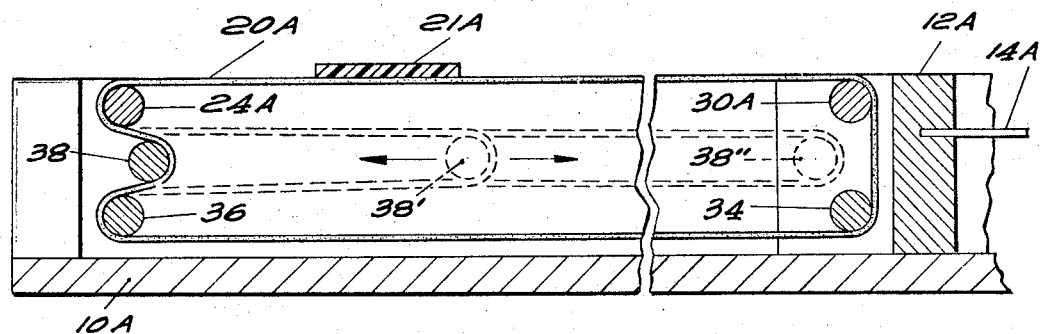
FIGURE 4 is a cross-sectional view in side elevation of a first modification of the instrument of FIGURE 1.

Single loop scales 20, 44, 45, etc., may have inadequate lengths for some applications. In this case, a long loop can be festooned over a series of rollers mounted below the rollers 17 and 25 in FIGURE 1; or a Mobius strip can be used as a scale. In FIGURE 4, a loop mounting is shown which is adapted to change the range of the scale. Parts similar to those of the foregoing embodiments are similarly numbered, with postscripts A. A loop time scale 20A is reeved about fixed rollers 25A and 36 mounted in the scale member 10A, and about rollers 17A and 34 mounted in the velocity index member 12A. In addition, the tape passes about a movable roller 38, which is slideable in slots 37 formed through the sidewalls of the member 10A, for longitudinal movement by a suitable projecting knob (not shown). The roller 38 can be secured in adjusted positions against the tension in the stretched loop 20A by any suitable means, such as a spring-loaded friction drag (not shown). In the position shown in solid lines at 38, the loop 20A is of a minimum length for any given position of the velocity index member 12A, and this setting therefore represents a minimum velocity range. As the roller 38 is moved to the right as viewed in FIGURE 4, through an intermediate position such as 38′, and toward an extreme position at 38″ abutting the member 12A, the time loop is lengthened and the velocity range is correspondingly increased to a maximum.

Figure 5:
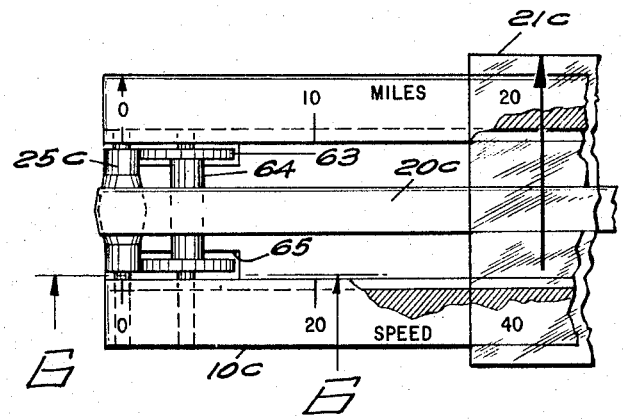
FIGURE 5 is a fragmentary plan view of a modified instrument particularly adapted for use in conjunction with a chart.
Figure 6:
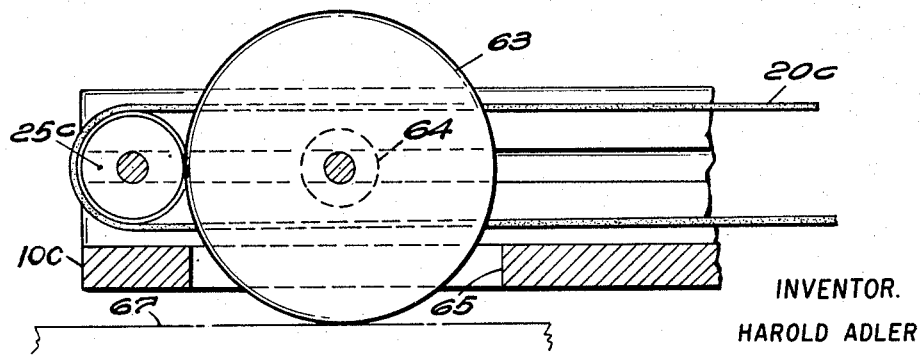
FIGURE 6 is a fragmentary sectional view in side elevation of the instrument of FIGURE 5.

It may be desired to use the improved computing instruments in connection with charts, and this can be done with any of the previously described constructions; it is preferable that the parts be formed of transparent plastic. Generally a rhumb line or course will be drawn on the chart, and the instrument is moved along this line as the trip progresses. However, it will be necessary to reset the time loop each time that the scale member 10 is moved along the course. To obviate this difficulty, a modification shown in FIGURES 5 and 6 employs chart rollers 63, which are rotatably mounted on an axle 64 in the member 10C, and project through slots 65 to engage a chart 67. Parts like those of the preceding embodiments are numbered alike, with postscripts C. The rollers 63 are in tangential frictional driving engagement with the roller 25C which carries the loop time scale 20C. As the scale member 10C is rolled along the chart, this drive arrangement causes the time scale 20C to travel in the reverse direction. Each point on the time loop remains stationary with respect to the corresponding point on the chart 67. The instrument can thus be rolled along the charted course at will without disturbing the correctness of the clock minute reading.

Figure 7:
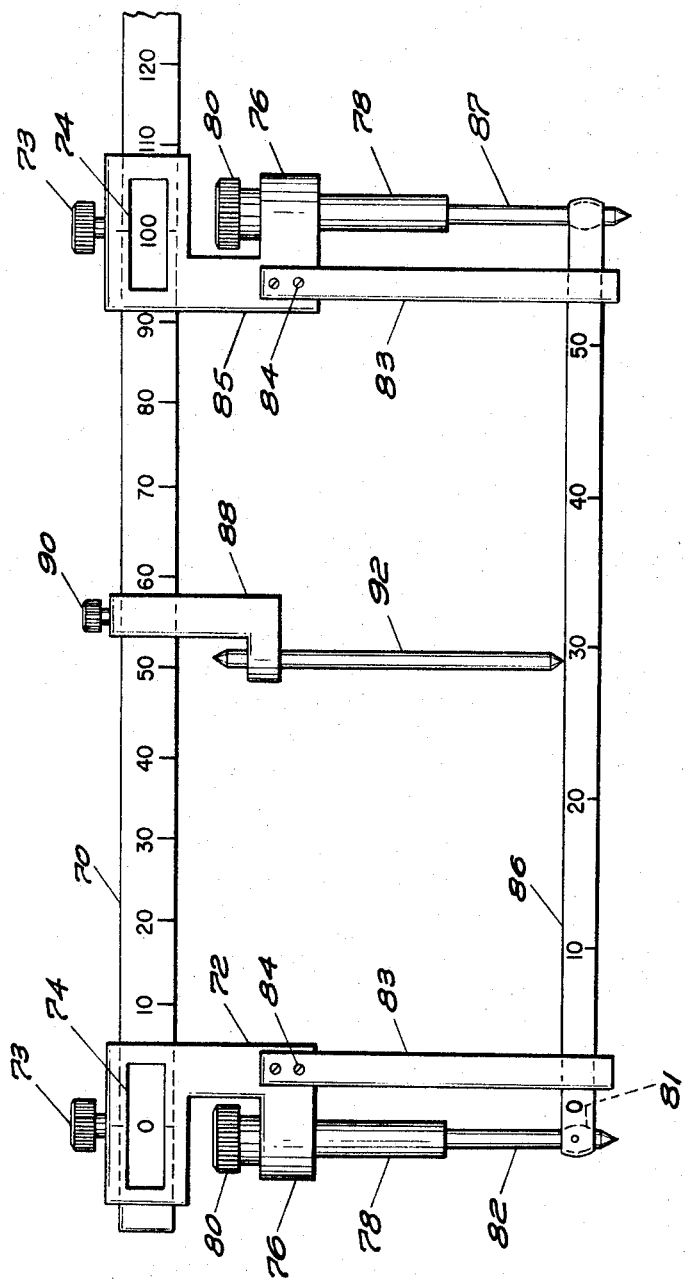
FIGURE 7 is a view in front elevation of an embodiment in a divider-type instrument.

The present invention has application to a divider instrument as well as to a slide-rule type of structure, and one such embodiment is shown in FIGURE 7. This instrument includes a beam 70 marked in mileage, which corresponds in function to the velocity/distance scale member 10 in the preceding embodiments. A first movable slide block 72, bearing an index point 82, takes the place of the shaft 24 in other constructions, and is ordinarily set at the zero point on the mileage scale by means of a set screw 73. A window 74 is provided in the block 72 for convenience in setting this index point. A projection 76 in the slide block mounts a bearing tube 78, inside which the index point 82 is rotatably received. A setting knob 80 is secured to the index point for convenience in adjusting an expansible loop time scale 86. To prevent the time scale 86 from sliding off, the index point is crowned at 81. A U-shaped retainer clip 83 is attached to the block 72 by screws 84, passing around the time scale with clearance.

A second slide block 85 rotatably supports a second movable index point 87, and is constructed the same as the first slide block; these elements serve the same functions as the velocity index member 12 in preceding embodiments. A cursor point 92 is carried by a third slide block 88 for movement along the beam 70, and is set in adjusted position by a screw 90. The cursor indicates the correspondence between time and mileage indicia, and the instrument is used in substantially the same manner as the previously described embodiments. It may be used with or without a chart, since the cursor makes it feasible to avoid reference to the chart while in transit.

Figure 8:
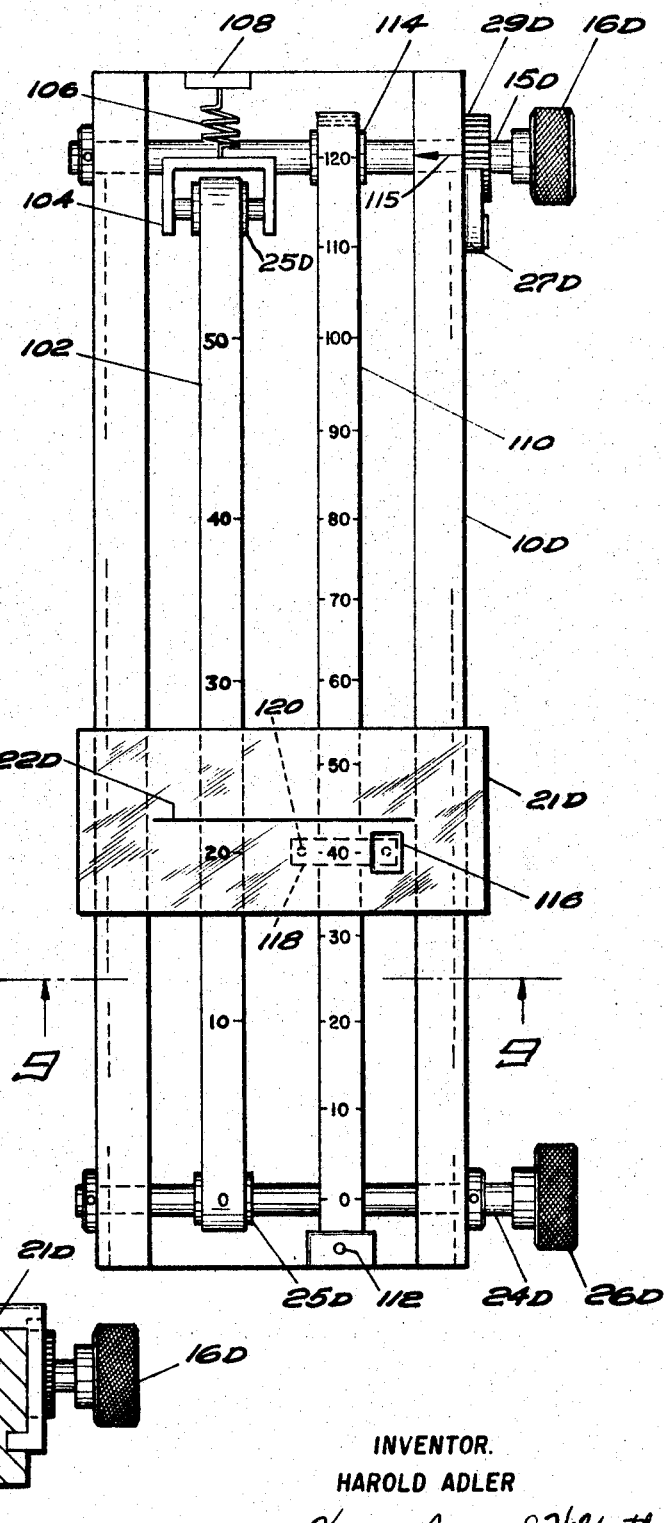
FIGURE 8 is a plan view of another modification.
Figure 9:
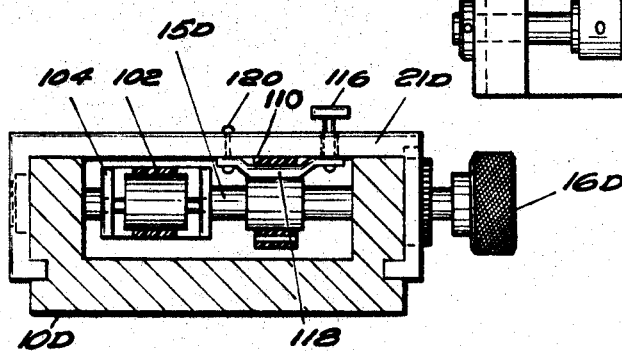
FIGURE 9 is a sectional view taken along line 9—9 in FIGURE 8.

Another embodiment is shown in FIGURES 8 and 9 in which an expansible scale 110 does not comprise a loop, but is a single length of stretchable material extending from an attachment point 112 on the beam 10D to a roller 114. The scale 110 is adjustable by reeling it on the roller, by means of a knob 16D affixed to a shaft 15D, which in this case comprises the movable index member. Parts similar to those of the embodiments of FIGURES 1–6 are numbered alike, with postscripts D.

The expansible scale 110 is in this case marked with velocity or mileage indicia, rather than time indicia as in the preceding embodiments. A nonexpansible loop scale 102 is marked with time indicia about its periphery, and has a full scale of two hours, so that each run of the scale represents one hour. The scale 102 is reeved on rollers 25D, one of which is carried by a shaft 24D having a setting knob 26D, and the other by a yoke 104 which is spring-mounted at 106 on a supporting block 108. Since the 60-minute mark is hidden beneath one of the rollers 25D in the illustrated setting, the shaft 15D is set so that its axis would coincide with the 60-minute mark if the scale 102 were laid out flat. Accordingly, an index mark 115 on the beam 10D indicates the velocity or the mileage on the scale 110 which corresponds to 60 minutes of time on the scale 102.

As an additional feature, the cursor 21D bears a spring clamp 118 riveted thereon at 120, for normally holding the cursor fixed on the expansible scale 110 as this scale is adjusted by the knob 16D. The cursor is releasable by depressing a button 116 affixed to the clamp 118.

The instrument is used in a manner analogous to the preceding embodiments. On departure, the scale 102 is set to show current clock minutes at the zero index. The scale 110 is set to show estimated speed, and the cursor is released and set to estimated time of arrival at a checkpoint of known distance. On arrival at the checkpoint, the user turns the knob 16D, but does not release the cursor, to align the hairline 22D of the cursor with the actual clock time at that point. This automatically readjusts the velocity scale to the velocity actually made good to that point. The cursor may then be released by depressing the button 116, and shifted along the scale 110 to the position of any further point in the journey; the hairline then shows the estimated clock time of arrival at that point, on the scale 102.

Figure 10:
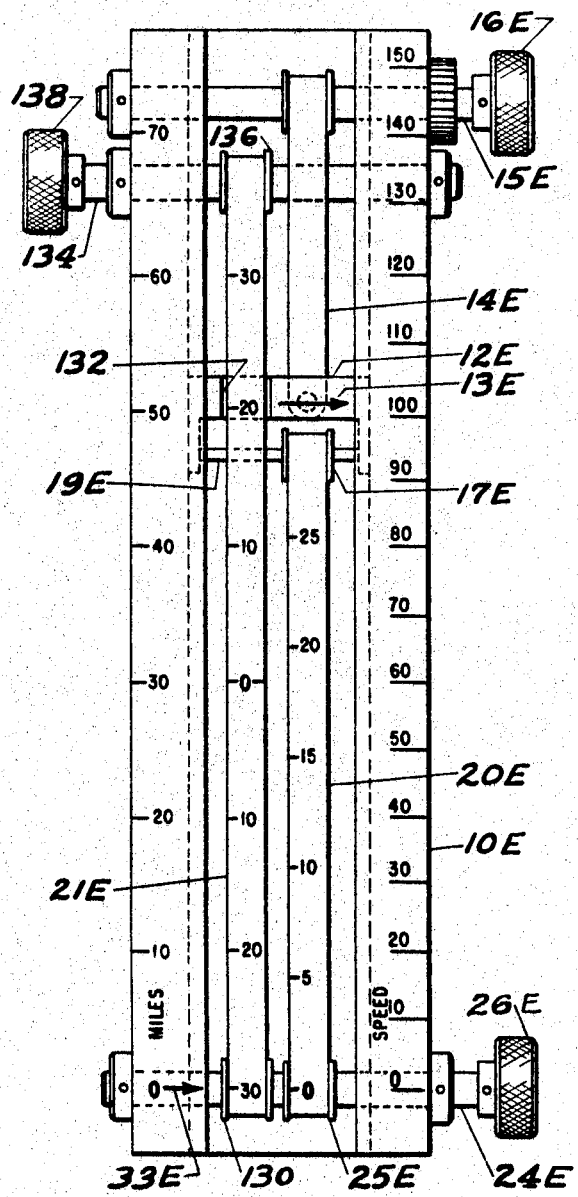
FIGURE 10 is a plan view showing a modification having a loop cursor.

In FIGURE 10, an instrument is shown in which the sliding cursor 21 of preceding embodiments is replaced by a loop cursor 21E of nonstretching material, for the purpose of giving a direct reading of the distance between checkpoints. Parts similar to those in the preceding embodiments are similarly numbered, with postscripts E. The cursor loop 21E is reeved about a roller 130, which is freely rotatably mounted on the shaft 24E by means of ball bearings or the like, so that a change in the setting of the time scale 20E by the knob 26E will not affect the cursor setting. A roller 136 supports the free end of the cursor loop on a setting shaft 134 to which this roller is affixed. The cursor loop bears a zero index which corresponds in function to the hairline in the sliding type; and also forward- and reverse-reading mileage scales. A knob 138 on the shaft 134 is used to reset the cursor loop. A recess 132 in the velocity index member 12E allows free passage of the cursor loop over, as well as under, this element.

In use, the operator initially sets the cursor zero index to the milage of his first check point. In transit, the distance remaining to the checkpoint is directly shown on the reverse-reading scale of the cursor tape opposite the current clock time. On arrival, the time scale is adjusted by the knob 16E. The distance from the current check point to the next one being known, the total mileage and estimated time of arrival at that point may be read on the mileage and time scales opposite that distance as shown on the cursor loop, without mentally adding the distances between all check points previously passed to find the location of the next checkpoint on the mileage scale. The cursor tape is then roller forward by the knob 138 to align its zero index with the mileage at the next checkpoint, and used en route as before.

Figure 11:
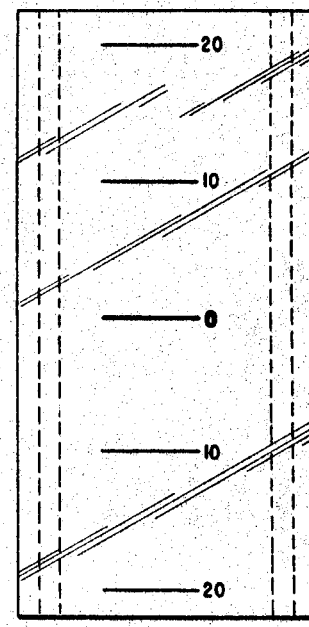
FIGURE 11 shows a modified cursor.

A modified slide-type cursor 21F is shown in FIGURE 11, which is lengthened and provided with forward and reverse mileage indicia as well as a zero index. This cursor serves similar purposes to the loop cursor of FIGURE 10, and may be used in place of the slide cursors in FIGURE 1, 3, 4 or 5.

While I have described preferred embodiments of my improved computer by way of illustration, it will be apparent to those skilled in the art that various changes and modifications may be made therein without departing from the true spirit and scope of the invention, which I therefore intend to define in the appended claims without limitation to the details of the foregoing embodiments.

What I claim is:

1. A dead-reckoning computer for estimating clock time of arrival at a destination on the base of anticipated speed, and correcting the estimate for speed made good at a known intermediate point in the trip current clock time, said computer comprising: a beam; a first scale extending along said beam; an expansible scale extending along said beam for comparison with said first scale; means for adjusting the expansion of said expansible scale; one of said scales being marked with time indicia, and the other with velocity and/or mileage indicia; one of said scales comprising a continuous loop; means rotatably supporting said loop for altering its position; and registering means drivingly connected with said rotatable means for recording rotation of said loop.

2. A computer as recited in claim 1, together with cursor means mounted movably along said beam and having an index for comparing time of travel with distance to a known checkpoint.

3. A dead-reckoning computer as recited in claim 1, in which said rotatable means comprises shaft means, and said registering means comprises a revolution counter drivingly connected with said shaft means.

4. A dead-reckoning computer as recited in claim 1, in which said rotatable means comprises shaft means, and said registering means comprises a nonstretching loop rotatably supported at one end on said beam and at an opposite end on said rotatable means for rotation therewith, said nonstretching loop bearing mileage indicia.

5. A dead-reckoning computer as recited in claim 4, in which said registering means includes a further nonstretching loop rotatably supported at one end on said beam and at an opposite end on said shaft means for rotation therewith, said first-mentioned nonstretching loop bearing forward-reading mileage indicia and said further nonstretching loop bearing reverse-reading mileage indicia.

6. A dead-reckoning computer as recited in claim 2, in which said cursor means comprises a slide mounted on said beam for sliding movement along said first scale.

7. A dead-reckoning computer as recited in claim 2, in which said cursor means comprises a loop extending along said first scale and rotatably supported in said beam.

8. A dead-reckoning computer as recited in claim 2, in which said cursor means is provided with forward-and/or reverse-reading mileage indicia extending from said index parallel to said first scale.

References Cited

UNITED STATES PATENTS

| | | | |
|---|---|---|---|
| 101,411 | 4/1870 | Bache | 33—137 |
| 120,621 | 11/1871 | Chassaing | 33—137 |
| 2,256,116 | 9/1941 | Hughes | 235—69 |
| 3,213,544 | 10/1965 | Adler | 33—158 |
| 3,330,478 | 7/1967 | Berry | 235—61 |

STEPHEN J. TOMSKY, *Primary Examiner.*